(12) United States Patent
Furukawa et al.

(10) Patent No.: US 6,363,126 B1
(45) Date of Patent: Mar. 26, 2002

(54) DEMODULATOR

(75) Inventors: Hitonobu Furukawa; Masami Takigawa, both of Osaka; Akira Mishima, Gifu; Hiroaki Ozeki; Sachiko Hayashi, both of Osaka, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/209,734

(22) Filed: Dec. 11, 1998

(30) Foreign Application Priority Data

Dec. 12, 1997 (JP) .............................. 9-342469

(51) Int. Cl.$^7$ .............................................. H04L 27/06
(52) U.S. Cl. ........................................ 375/344; 375/332
(58) Field of Search ................................ 375/316, 329, 375/332, 344, 354, 362, 375; 329/304, 306, 307

(56) References Cited

U.S. PATENT DOCUMENTS 5,289,506 A * 2/1994 Kitayama et al. ............ 375/344
5,440,587 A * 8/1995 Ishikawa et al. ............. 375/332
5,905,405 A * 5/1999 Ishizawa ..................... 329/308
5,991,344 A * 11/1999 Fujii et al. ................... 375/344
5,995,563 A * 11/1999 Ben-Efraim et al. ........ 374/344

* cited by examiner

Primary Examiner—Stephen Chin
Assistant Examiner—Chieh M. Fan
(74) Attorney, Agent, or Firm—Rossi & Associates

(57) ABSTRACT

The invention presents an apparatus capable of demodulating stably if there are time-course changes in the constituent parts in a demodulator of digital modulated signal. This demodulator comprises an operator for setting the oscillation frequency of a local oscillator 2, and within a passing frequency band of a band pass filter BPF 3, the operator controls the local oscillator 2 so that the frequency of the output signal of a first mixer 1 may settle within a control band in a controllable frequency band of an AFC feedback loop composed of an orthogonal detector 4, a carrier regenerator 9, a frequency error detector 10, a frequency controller 11, a signal selector 12, a D/A converter 13, and a VCO 14, and a local carrier is issued from the local oscillator 2 to the first mixer 1.

42 Claims, 7 Drawing Sheets

DEMODULATOR

BACKGROUND OF THE INVENTION

The present invention relates to a demodulator in a receiver, and more particularly to a demodulator of digital modulated signal.

Recently, as satellite broadcasting is being digitized, the demodulator by synchronous detection system of digital modulation method has come to be used in the receiver. Such demodulator is often provided with a function of automatic frequency control (AFC) using a voltage controlled oscillator (VCO).

FIG. 7 is an example of a schematic constitution of a conventional demodulator realizing an AFC circuit using VCO by digital signal processing.

In FIG. 7, a QPSK modulated signal and a local carrier issued from a local oscillator 22 are both put into a mixer 21. In the mixer 21, the QPSK modulated signal is converted in frequency to an intermediate frequency signal (IF signal), and is fed into an orthogonal detector 4 through a band pass filter (BPF) 3. The orthogonal detector 4 converts the IF signal issued from the BPF 3 into orthogonal I, Q base band signals by the transmission output carrier of a VCO 14. By A/D converters (ADC) 5 and 6, analog I, Q base band signals are converted into digital I, Q base band signals. The digitized I, Q base band signals are shaped in waveform by low pass filters (LPF) 7 and 8 of waveform shaping type (digital transversal type) of low pass type, and transmitted to a carrier regenerator 9.

The carrier regenerator 9 detects the phase difference of the phase of the input signal contained in the I, Q base band signals and the reference phase, and issues a reproduction carrier synchronized in phase with the I, Q base band signals from this phase difference signal. A frequency error detector 10 detects a frequency error between the center frequency of QPSK modulated signal and oscillation frequency of the VCO 14, from the phase difference signal of the carrier regenerator 9. This frequency error is smoothed by a frequency controller 11, and converted into an analog signal by a D/A converter (DAC) 13, then transmitted to the VCO 14 as control signal. The operating frequency of the VCO 14 is controlled by the control signal, and the frequency error is compensated.

The frequency error of the center frequency of the QPSK modulated signal and the oscillation frequency of the VCO 14 is always compensated by a feedback loop of AFC composed of the orthogonal detector 4, carrier regenerator 9, frequency error detector 10, frequency controller 11, DAC 13, and VCO 14. Accordingly, the output of the VCO 14 having the same frequency as the QPSK modulation frequency is transmitted to the orthogonal detector 4, and the QPSK modulated signal is synchronously detected in the orthogonal detector 4, and the I, Q base band signals low in error rate are always supplied to the carrier regenerator 9.

In the satellite broadcast, incidentally, dielectric resonators are used in the local oscillator 22 and VCO 14 of the modulator of the BS converter. The dielectric resonators have ambient temperature dependence and time-course changes. Therefore, the frequency of the local oscillator 22 is often detuned from the reference frequency, and its detuning frequency may sometimes reach as much as several mega-Hertz. As for oscillation frequency of the local oscillator 22, in addition to the average frequency detuning from the reference frequency, there is also a frequency drift due to changes of ambient temperature, and this frequency drift cannot be ignored, too.

Further, by using a dielectric resonator in the VCO 14, the voltage-frequency conversion sensitivity characteristic of the VCO 14 has an offset amount, and this offset amount may cause a drift of several mega-Hertz due to time-course changes. Moreover, the inclination of the voltage-frequency conversion sensitivity characteristic may also change in the time course.

In the conventional demodulator described above, if the detuning frequency of the local oscillator 22 surpasses the passing frequency band of the BPF 3, owing to the aforesaid cause, part of the QPSK modulated signal is cut off by the BPF 3, and the error rate characteristic of the demodulator deteriorates significantly. To solve this problem, it has been proposed to detect the detuning frequency of the local oscillator 22 by the frequency error detector 10, and control the local oscillator 22 so that part of the QPSK modulated signal may not be cut off by the BPF 3, but since the detuning frequency value of the local oscillator 22 and the frequency offset value of the voltage-frequency conversion characteristic of the VCO 14 settle in a same AFC feedback loop, the detuning frequency value of the local oscillator 22 and the frequency offset value of the VCO 14 cannot be separated and detected from the frequency information of the AFC.

Besides, as the value of the frequency offset of the voltage-frequency conversion characteristic of the VCO 14 increases, the control frequency band that can be controlled by the AFC becomes narrower, and it may be out of the control frequency band of the AFC depending on the magnitude and direction of the detuning frequency of the local oscillator 22, and control is not converged stably, and demodulation is disabled.

Still more, if the inclination of the voltage-frequency conversion characteristic changes in the time course, the control frequency band controllable by the AFC may be narrower, and the AFC is not converged stably, and demodulation is disabled.

These are the problems of the demodulator by the synchronous detection system of digital modulation system used in the conventional BS converter.

SUMMARY OF THE INVENTION

It is hence an object of the invention to solve the above problems, and to present a demodulator in which part of input signal is not cut off by the band pass filter if the detuning frequency of the local oscillator of the demodulator of BS converter surpasses the passing frequency band of the band pass filter, and the frequency offset of the voltage-frequency conversion sensitivity characteristic of the VCO is detected by separating from the detection of the detuning frequency of the local oscillator if the inclination of the voltage-frequency conversion sensitivity characteristic of the VCO changes in the time course, so that the AFC operates stably, thereby preventing deterioration of error rate characteristic or unstable demodulation.

To achieve the object, the invention presents a demodulator comprising a first mixer for converting an input modulated signal into an intermediate frequency signal by frequency conversion, a local oscillator for issuing a local oscillation signal to this mixer, a first band pass filter of band passing type for shaping the waveform of the intermediate frequency signal converted in frequency by the mixer, an orthogonal detector for demodulating the signal shaped in waveform by this filter into orthogonal signals of I, Q channels, a voltage controlled oscillator (VCO) for issuing an oscillation signal to this orthogonal detector, an A/D converter for converting the orthogonal signals of the I, Q channels into digital signals, a second low pass filter of low pass type for shaping the waveform of the output signal from this A/D converter, a carrier regenerator for detecting phase information relating to a carrier from the signal shaped in waveform by this low pass filter for obtaining a generated carrier, a frequency error detector for detecting the frequency error information between the intermediate frequency signal and oscillation frequency of the VCO on the basis of the phase information of this carrier regenerator, a frequency controller for controlling the oscillation frequency of the VCO by the frequency error information detected by this frequency error detector, a signal selector for selecting either the output of this frequency controller or the reference value, a D/A converter for converting the signal from this signal selector into an analog signal, and issuing to the VCO, a frequency divider for dividing the frequency of the output signal of the VCO, a pulse counter for counting signals divided in frequency by this frequency divider for a reference time, and an operator having a function of issuing a selection signal to the signal selector by the output of this pulse counter, and a function of setting the oscillation frequency of the local oscillator by the output of the frequency controller, in which the operator controls the local oscillator so that the frequency of the output signal of the first mixer may exist within the passing frequency band of the first band pass filter, and also settle in the control band which is a frequency band controllable by an AFC feedback loop composed of the orthogonal detector, the carrier regenerator, the frequency error detector, the frequency controller, the signal selector, the D/A converter, and the VCO, and the local oscillator issues a local carrier to the first mixer.

Preferably, the operator selects the reference value in the signal selector, and when the feedback loop of the AFC is opened, the reference value is transmitted to the D/A converter, and is converted into an analog signal. By the analog signal, the VCO is controlled, and the oscillation frequency of the VCO is defined. The output of the VCO is transmitted to the frequency divider. In the frequency divider, the oscillation frequency is divided, and is transmitted to the pulse counter to be counted for a specific time. The operator detects the oscillation frequency of the VCO from the output of the pulse counter. When the reference value is selected, the frequency difference between the design frequency oscillated by the VCO and the frequency measured by the frequency divider and pulse counter is the frequency offset of the VCO, and therefore the operator calculates the frequency band controllable by the AFC by using the calculated frequency offset of the VCO, and calculates the control band in the AFC controllable frequency band and in the passing band frequency band of the band pass filter.

The operator sets the frequency value calculated so that the output signal frequency of the first mixer may settle within the control band, in the local oscillator.

The operator closes the feedback loop of the AFC by using the signal selector.

The input modulated signal is converted into an intermediate frequency signal by the first mixer. The local oscillator is connected to the first mixer, and the oscillation frequency is set by the operator. The intermediate frequency signal is shaped in waveform by the first band pass filter, and is converted into I, Q base band signals by the orthogonal detector. The VCO is connected to the orthogonal detector. The I, Q base band signals converted in frequency by the portion of the frequency of this VCO are converted into a digital value by the A/D converter, and shaped in waveform by the second low pass filter, and put into the carrier regenerator. The carrier regenerator detects the phase information relating to the carrier from the input signal, and obtains a regenerated carrier. The frequency error detector detects the frequency difference information of the intermediate frequency signal and oscillation frequency of the VCO on the basis of the phase information of the carrier regenerator. The output of the frequency error detector is smoothed by the frequency controller, and is converted into an analog signal by the D/A converter. The output of the D/A converter controls the VCO, and corrects the oscillation frequency of the VCO.

The operator reads the frequency converged by the AFC from the output of the frequency controller.

This frequency includes tuning frequency component of the local oscillator of the demodulator and frequency offset component of the VCO, and therefore the operator calculates the detuning frequency component of the local oscillator of the demodulator by using the frequency offset component of the VCO calculated preliminarily.

The operator, using the detuning frequency component of the local oscillator of the demodulator, sets the frequency value calculated so that the output signal frequency of the mixer may settle within the control band, in the local oscillator.

In this constitution, the invention issues the output from the local oscillator of the demodulator to the mixer so that the output signal of the first mixer may settle within the control band, and if the detuning frequency of the local oscillator of the demodulator surpasses the passing frequency band of the first band pass filter, the input modulated signal is not cut off by this first band pass filter to cause deterioration of error rate, and moreover if the controllable frequency band of the AFC is narrowed due to onset of frequency offset of the voltage-frequency conversion sensitivity characteristic of the VCO, not running away from the controllable frequency band, the feedback loop of the AFC is always converged stably.

DESCRIPTION OF THE PREFERRED EMBODIMENTS

Figure 1:
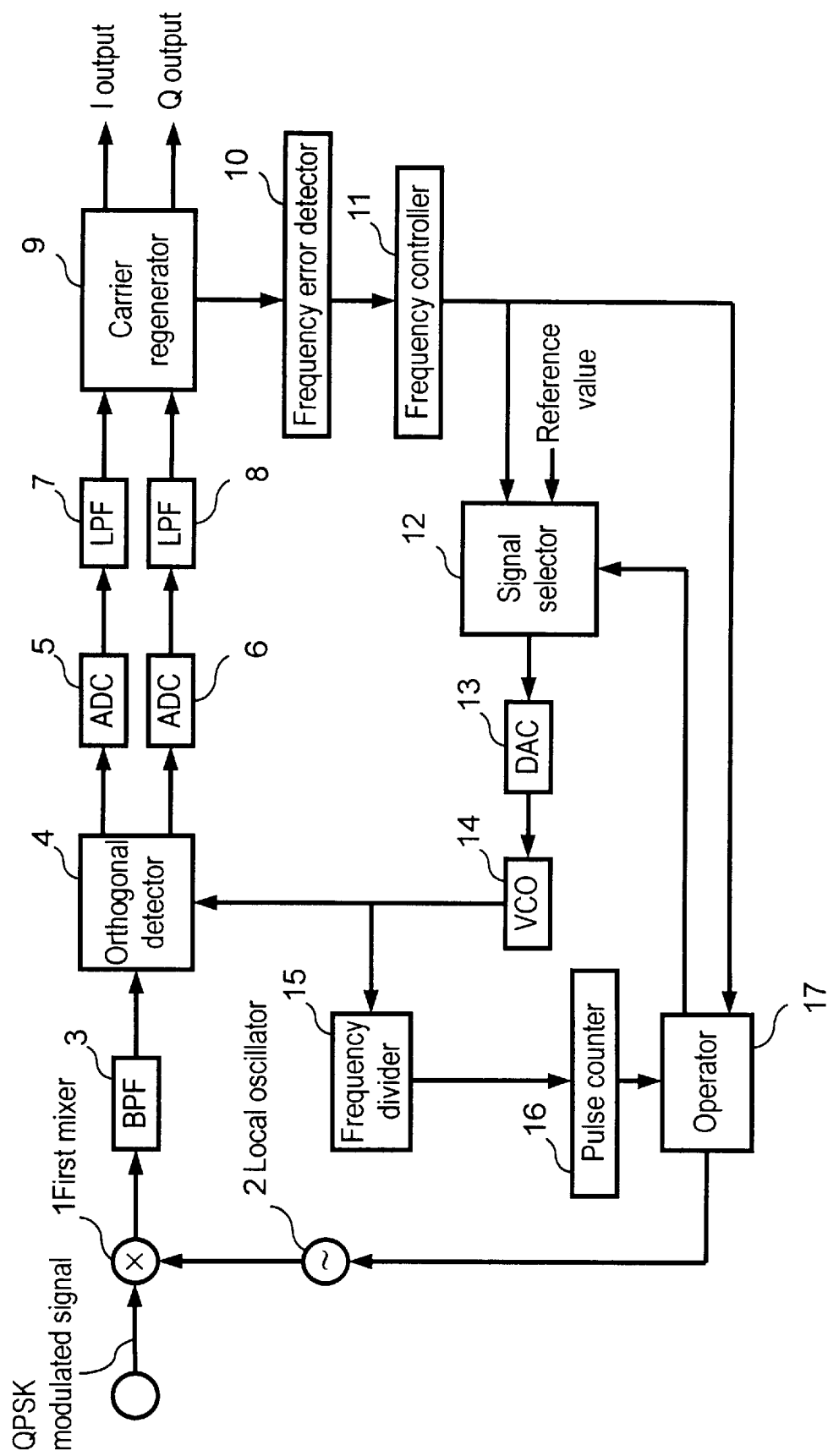
FIG. 1 is a block diagram of a demodulator in a first embodiment of the invention.

FIG. 1 is a block diagram of a demodulator in a first embodiment of the invention. By setting of an operator 17, a signal selector 12 selects a reference value. The selected reference value is converted into an analog signal by a D/A converter DAC 13, and the oscillation frequency of a VCO 14 is defined. The output signal of the VCO 14 is divided into a lower frequency by a frequency divider 15, and the number of pulses is counted by a pulse counter 16 for a reference time. The operator 17 reads out the counted value from the pulse counter 16. On the basis of the frequency dividing ratio of the frequency divider 15 and the reference time and read-out counted value of the pulse counter 16, the operator 17 calculates the oscillation frequency of the VCO 14. Supposing the frequency dividing ratio of the frequency divider 15 to be D15, the reference time of the pulse counter 16 to be T1, and the read-out counted value to be N1, the oscillation frequency f1-1 of the VCO 14 is determined in the following formula (1).

$$f1\text{-}1 = (N1/T1)D15 \tag{1}$$

The operator 17 calculates the difference between the design oscillation frequency and f1-1 when the reference value is set in the VCO 14, and calculates the frequency offset foff of the VCO 14.

In a control system of an AFC feedback loop composed of an orthogonal detector 4 used as detector, A/D converters ADC5, 6, LPF 7, 8 used as second low pass filters of waveform shaping type of low pass type, a carrier regenerator 9, a frequency error detector 10, a frequency controller 11, a signal selector 12, a D/A converter DAC 13, and VCO 14, since foff corresponds to disturbance in the feedback loop, the controllable frequency band of the AFC is narrower by the portion equivalent to foff.

The operator 17 calculates the difference between the design value of the AFC controllable frequency band and foff, and calculates an AFC controllable frequency band f1-2.

The operator 17 compares the passing frequency band f1-3 of the BPF 3 used as the first band pass filter, and f1-2. The lower frequency of the upper limit frequency of f1-2 and f1-3, and the higher frequency of the lower limit frequency are selected, and the frequency band defined by them is set as a control band.

The operator 17 closes the feedback loop of the AFC by using the signal selector 12.

The modulated signal entered in a first mixer 1 is converted in frequency to an intermediate frequency signal. A local oscillator 2 is connected to the first mixer 1, and the oscillation frequency of the local oscillator is set by the operator 17.

The intermediate frequency signal is shaped in waveform by the BPF 3 of band pass type, and is converted into I, Q base band signals by the orthogonal detector 4. The VCO 14 is connected to the orthogonal detector 4. The I, Q base band signals converted in frequency only by the portion of oscillation frequency of the VCO 14 are converted into a digital value by the ADC 5, and shaped in waveform by the LPF 7, 8, and is entered into the carrier regenerator 9. The carrier regenerator 9 detects the phase information relating to the carrier from the input signal, and obtains a regenerated carrier. The frequency error detector 10 detects the frequency difference information of the intermediate frequency signal and oscillation frequency of the VCO on the basis of the phase information of the carrier regenerator 9. The output of the detector 10 is smoothed by the frequency controller 11, and is converted into an analog signal by the DAC 13. The output of the DAC 13 controls the VCO 14, and corrects the oscillation frequency of the VCO 14.

After the AFC is stably converged, the operator 17 reads in the output of the frequency controller 11, and calculates the frequency at which the AFC is converged on the basis of the voltage-frequency conversion sensitivity characteristic of the VCO 14.

The operator 17 subtracts the frequency offset foff of the VCO 14 from the frequency at which the AFC is converged, and caculates the detuning frequency possessed by input modulated signal.

The operator 17 calculates the oscillation frequency of the local oscillator 2 and sets the local oscillator 2 so that the output signal frequency of the mixer 1 of the input modulated signal detuned by the calculated detuning frequency may settle within the control band.

Thus, the operator 17 calculates the detuning frequency of the input modulated signal, and determines the oscillation frequency of the local oscillator 2 so that the output signal frequency of the first mixer 1 may settle within the preliminarily calculated control band, and therefore frequency signal exceeding the passing band frequency of the BPF 3 is not entered in the BPF 3. If the detuning frequency of the input modulated signal is altered due to changes in ambient temperature, the AFC is converged stably as far as the output signal frequency of the first mixer 1 is within the control band.

In the first embodiment, if the detuning frequency of the input modulated signal is increased and is out of the passing frequency band of the BPF 3, by determining the oscillation frequency of the local oscillator 2 so that the output signal frequency of the first mixer 1 may settle within the control band, the input modulated signal component is not cut off by the BPF 3, and the bit error rate (BER) characteristic does not deteriorate.

Figure 2:
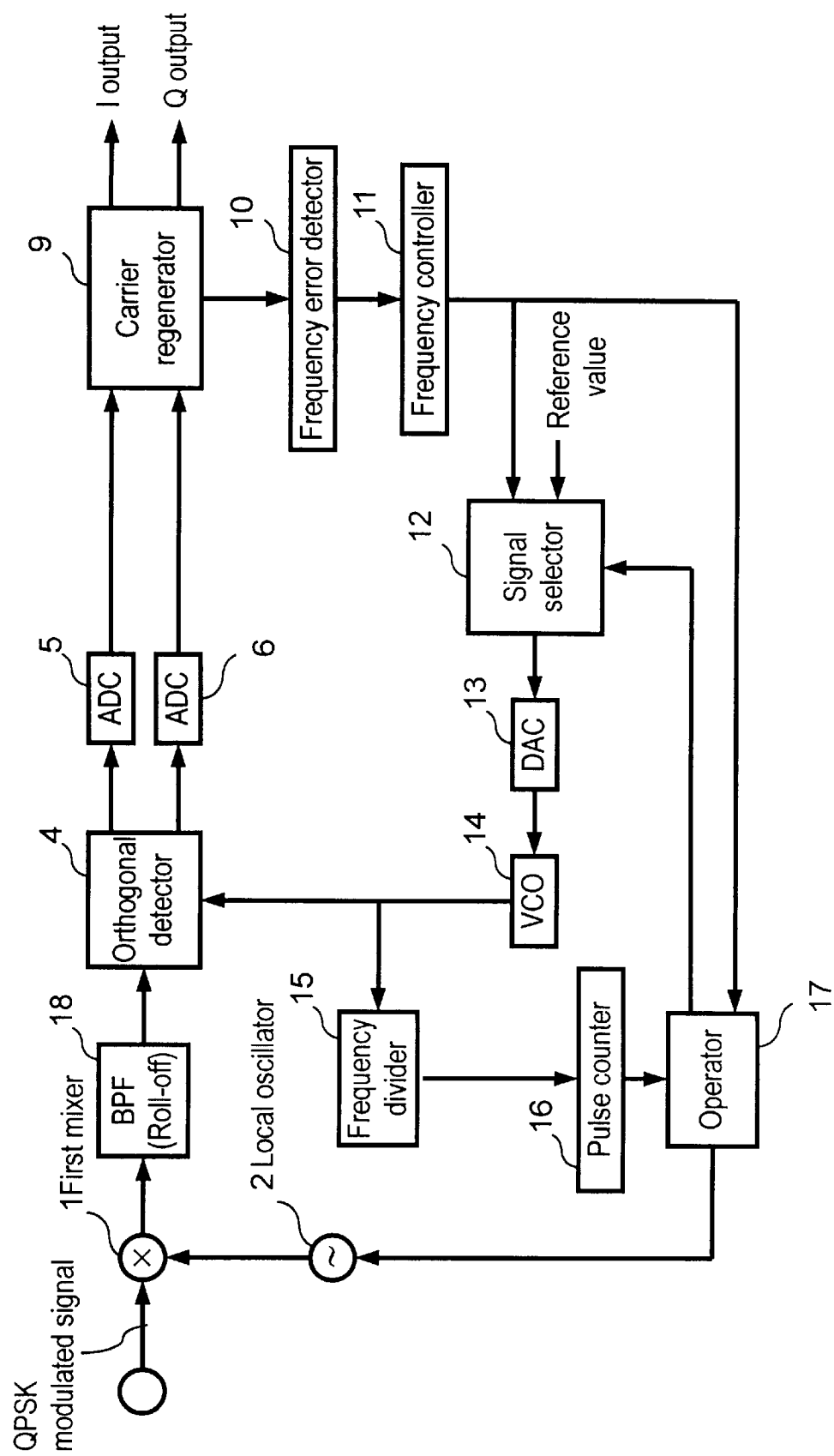
FIG. 2 is a block diagram of a demodulator in a second embodiment of the invention.

FIG. 2 is a block diagram of a demodulator in a second embodiment of the invention. In the explanation of FIG. 2, the parts having the same function as in FIG. 1 are identified with same reference numerals. By setting of an operator 17, a signal selector 12 selects a reference value. The selected reference value is converted into an analog signal by a DAC 13, and the oscillation frequency of a VCO 14 is defined. The output signal of the VCO 14 is divided into a lower frequency by a frequency divider 15, and the number of pulses is counted by a pulse counter 16 for a reference time. The operator 17 reads out the counted value from the pulse counter 16. On the basis of the frequency dividing ratio of the frequency divider 15 and the reference time and read-out counted value of the pulse counter 16, the operator 17 calculates the oscillation frequency of the VCO 14. Supposing the frequency dividing ratio of the frequency divider 15 to be D15, the reference time of the pulse counter 16 to be T1, and the read-out counted value to be N1, the oscillation frequency f1-1 of the VCO 14 is determined in the following formula (2).

$$f1\text{-}1 = (N1/T1)D15 \tag{2}$$

The operator 17 calculates the difference between the design oscillation frequency and f1-1 when the reference value is set in the VCO 14, and calculates the frequency offset foff of the VCO 14.

In a control system of an AFC feedback loop composed of an orthogonal detector 4, ADC 5, 6, a carrier regenerator 9, a frequency error detector 10, a frequency controller 11, a signal selector 12, a DAC 13, and VCO 14, since foff corresponds to disturbance in the feedback loop, the controllable frequency band of the AFC is narrower by the portion equivalent to foff.

The operator 17 calculates the difference between the design value of the AFC controllable frequency band and foff, and calculates an AFC controllable frequency band f1-2.

The operator 17 compares the passing frequency band f1-3 of a BPF 18 used as a roll-off type band pass filter, and f1-2. The lower frequency of the upper limit frequency of f1-2 and f1-3, and the higher frequency of the lower limit frequency are selected, and the frequency band defined by them is set as a control band.

The operator 17 closes the feedback loop of the AFC by using the signal selector 12.

The modulated signal entered in a first mixer 1 is converted in frequency to an intermediate frequency signal. A local oscillator 2 is connected to the first mixer 1, and the oscillation frequency is set by the operator 17. The intermediate frequency signal is shaped in waveform by the BPF 18 having waveform shaping function, and is converted into I, Q base band signals by the orthogonal detector 4. The VCO 14 is connected to the orthogonal detector 4. The I, Q base band signals converted in frequency only by the portion of oscillation frequency of the VCO 14 are converted into a digital value by the ADC 5, 6, and is entered into the carrier regenerator 9. The carrier regenerator 9 detects the phase information relating to the carrier from the input signal, and obtains a regenerated carrier. The frequency error detector 10 detects the frequency difference information of the intermediate frequency signal and oscillation frequency of the VCO 14 on the basis of the phase information of the carrier regenerator 9. The output of the detector 10 is smoothed by the frequency controller 11, and is converted into an analog signal by the DAC 13. The output of the DAC 13 controls the VCO 14, and corrects the oscillation frequency of the VCO 14.

After the AFC is stably converged, the operator 17 reads in the output of the frequency controller 11, and calculates the frequency at which the AFC is converged on the basis of the voltage-frequency conversion sensitivity characteristic of the VCO 14.

The operator 17 subtracts the frequency offset foff of the VCO 14 from the frequency at which the AFC is converged, and calculates the detuning frequency possessed by input modulated signal.

The operator 17 calculates the oscillation frequency of the local oscillator 2 and sets the local oscillator 2 so that the output signal frequency of the first mixer 1 of the input modulated signal detuned by the calculated detuning frequency may settle within the control band.

Thus, the operator 17 calculates the detuning frequency of the input modulated signal, and determines the oscillation frequency of the local oscillator 2 so that the output signal frequency of the first mixer 1 may settle within the preliminarily calculated control band, and therefore frequency signal exceeding the passing band frequency of the BPF 18 is not entered in the BPF 18. If the detuning frequency of the input modulated signal is altered due to changes in ambient temperature, the AFC is converged stably as far as the output signal frequency of the first mixer 1 is within the control band.

In the second embodiment, if the detuning frequency of the input modulated signal is increased and is out of the passing frequency band of the BPF 18, by determining the oscillation frequency of the local oscillator 2 so that the output signal frequency of the first mixer 1 may settle within the control band, the input modulated signal component is not cut off by the BPF 18, and the BER characteristic does not deteriorate.

Figure 3:
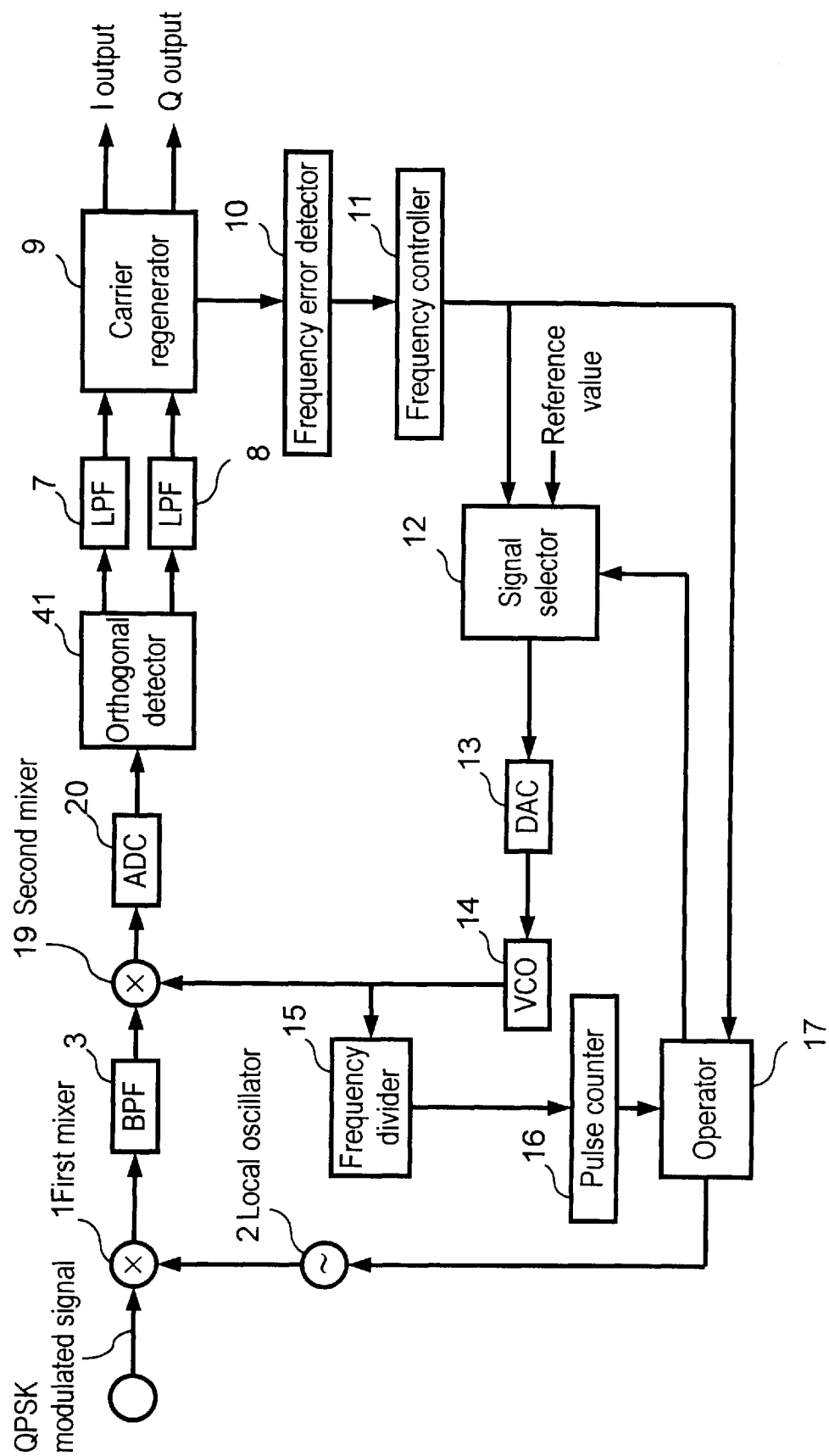
FIG. 3 is a block diagram of a demodulator in a third embodiment of the invention.

FIG. 3 is a block diagram of a demodulator in a third embodiment of the invention. In the explanation of FIG. 3, the parts having the same function as in FIG. 1 are identified with same reference numerals. By setting of an operator 17, a signal selector 12 selects a reference value. The selected reference value is converted into an analog signal by a DAC 13, and the oscillation frequency of a VCO 14 is defined. The output signal of the VCO 14 is divided into a lower frequency by a frequency divider 15, and the number of pulses is counted by a pulse counter 16 for a reference time. The operator 17 reads out the counted value from the pulse counter 16. On the basis of the frequency dividing ratio of the frequency divider 15 and the reference time and read-out counted value of the pulse counter 16, the operator 17 calculates the oscillation frequency of the VCO 14. Supposing the frequency dividing ratio of the frequency divider 15 to be D15, the reference time of the pulse counter 16 to be T1, and the read-out counted value to be N1, the oscillation frequency f1-1 of the VCO 14 is determined in the following formula (3).

$$f1\text{-}1=(N1/T1)D15 \qquad (3)$$

The operator 17 calculates the difference between the design oscillation frequency and f1-1 when the reference value is set in the VCO 14, and calculates the frequency offset foff of the VCO 14.

In a control system of an AFC feedback loop composed of a second mixer 19, an A/D converter ADC 20, an orthogonal detector 41, LPF 7, 8, a carrier regenerator 9, a frequency error detector 10, a frequency controller 11, a signal selector 12, a DAC 13, and VCO 14, since foff corresponds to disturbance in the feedback loop, the controllable frequency band of the AFC is narrower by the portion equivalent to foff.

The operator 17 calculates the difference between the design value of the AFC controllable frequency band and foff, and calculates an AFC controllable frequency band f1-2. The operator 17 compares the passing frequency band f1-3 of a BPF 3 and f1-2. The lower frequency of the upper limit frequency of f1-2 and f1-3, and the higher frequency of the lower limit frequency are selected, and the frequency band defined by them is set as a control band.

The operator 17 closes the feedback loop of the AFC by using the signal selector 12.

The modulated signal entered in a first mixer 1 is converted in frequency to an intermediate frequency signal. A local oscillator 2 is connected to the first mixer 1, and the oscillation frequency is set by the operator 17. The intermediate frequency signal is shaped in waveform by the BPF 3 of band pass type, and is converted in frequency by the second mixer 19. The VCO 14 is connected to the second mixer 19. The signal converted in frequency only by the portion of oscillation frequency of the VCO 14 is converted into a digital value by the ADC 20, and is converted into I, Q orthogonal signals by the orthogonal detector 41. The I, Q orthogonal signals are shaped in waveform by the LPF 7, 8, and entered into the carrier regenerator 9. The carrier regenerator 9 detects the phase information relating to the carrier from the input signal, and obtains a regenerated carrier. The frequency error detector 10 detects the frequency difference information of the intermediate frequency signal and oscillation frequency of the VCO 14 on the basis of the phase information of the carrier regenerator 9. The output of the detector 10 is smoothed by the frequency controller 11, and is converted into an analog signal by the DAC 13. The output of the DAC 13 controls the VCO 14, and corrects the oscillation frequency of the VCO 14.

After the AFC is stably converged, the operator 17 reads in the output of the frequency controller 11, and calculates the frequency at which the AFC is converged on the basis of the voltage-frequency conversion sensitivity characteristic of the VCO 14.

The operator 17 subtracts the frequency offset foff of the VCO 14 from the frequency at which the AFC is converged, and calculates the detuning frequency possessed by input modulated signal.

The operator 17 calculates the oscillation frequency of the local oscillator 2 and sets the local oscillator 2 so that the output signal frequency of the first mixer 1 of the input modulated signal detuned by the calculated detuning frequency may settle within the control band.

Thus, the operator 17 calculates the detuning frequency of the input modulated signal, and determines the oscillation frequency of the local oscillator 2 so that the output signal frequency of the first mixer 1 may settle within the preliminarily calculated control band, and therefore frequency signal exceeding the passing band frequency of the BPF 3 is not entered in the BPF 3. If the detuning frequency of the input modulated signal is altered due to changes in ambient temperature, the AFC is converged stably as far as the output signal frequency of the first mixer 1 is within the control band.

In the third embodiment, if the detuning frequency of the input modulated signal is increased and is out of the passing frequency band of the BPF 3, by determining the oscillation frequency of the local oscillator 2 so that the output signal frequency of the first mixer 1 may settle within the control band, the input modulated signal component is not cut off by the BPF 3, and the BER characteristic does not deteriorate.

Figure 4:
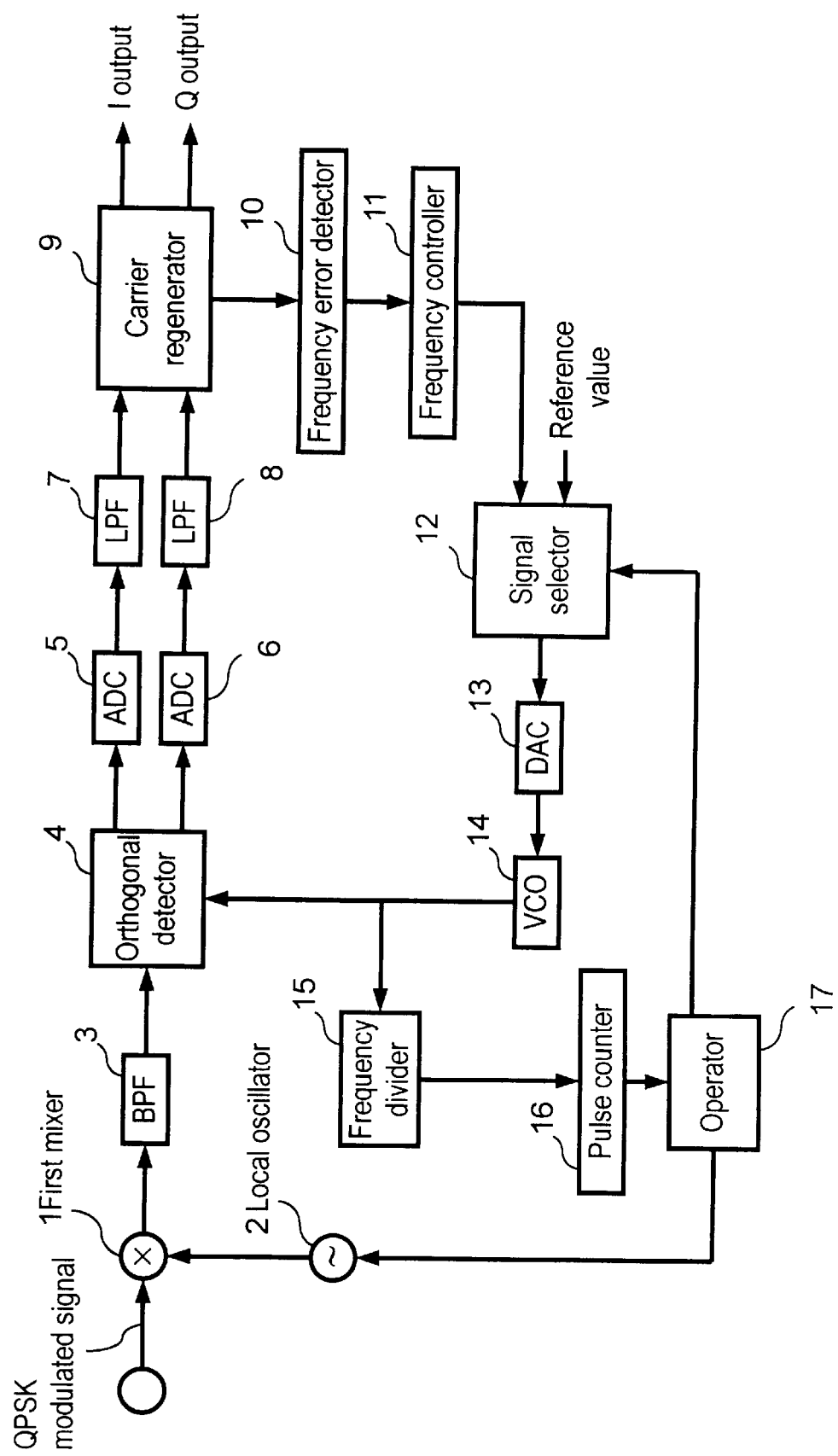
FIG. 4 is a block diagram of a demodulator in a fourth embodiment of the invention.

FIG. 4 is a block diagram of a demodulator in a fourth embodiment of the invention. In the explanation of FIG. 4, the parts having the same function as in FIG. 1 are identified with same reference numerals. By setting of an operator 17, a signal selector 12 selects a reference value. The selected reference value is converted into an analog signal by a DAC 13, and the oscillation frequency of a VCO 14 is defined. The output signal of the VCO 14 is divided into a lower frequency by a frequency divider 15, and the number of pulses is counted by a pulse counter 16 for a reference time. The operator 17 reads out the counted value from the pulse counter 16. On the basis of the frequency dividing ratio of the frequency divider 15 and the reference time and read-out counted value of the pulse counter 16, the operator 17 calculates the oscillation frequency of the VCO 14. Supposing the frequency dividing ratio of the frequency divider 15 to be D15, the reference time of the pulse counter 16 to be T1, and the read-out counted value to be N1, the oscillation frequency f1-1 of the VCO 14 is determined in the following formula (4).

$$f1\text{-}1 = (N1/T1)D15 \quad (4)$$

The operator 17 calculates the difference between the design oscillation frequency and f1-1 when the reference value is set in the VCO 14, and calculates the frequency offset foff of the VCO 14.

In a control system of an AFC feedback loop composed of an orthogonal detector 4, ADC 5, 6, LPF 7, 8, a carrier regenerator 9, a frequency error detector 10, a frequency controller 11, a signal selector 12, a DAC 13, and VCO 14, since foff corresponds to disturbance in the feedback loop, the controllable frequency band of the AFC is narrower by the portion equivalent to foff.

The operator 17 calculates the difference between the design value of the AFC controllable frequency band and foff, and calculates an AFC controllable frequency band f1-2.

The operator 17 compares the passing frequency band f1-3 of a BPF 3 and f1-2. The lower frequency of the upper limit frequency of f1-2 and f1-3, and the higher frequency of the lower limit frequency are selected, and the frequency band defined by them is set as a control band.

The operator 17 closes the feedback loop of the AFC by using the signal selector 12.

The modulated signal entered in a first mixer 1 is converted in frequency to an intermediate frequency signal. A local oscillator 2 is connected to the first mixer 1, and the oscillation frequency is set by the operator 17. The intermediate frequency signal is shaped in waveform by the BPF 3 of band pass type, and is converted into I, Q base band signals by the orthogonal detector 4. The VCO 14 is connected to the orthogonal detector 4. The I, Q base band signals converted in frequency by the portion of oscillation frequency of the VCO 14 are converted into a digital value by the ADC 5, and shaped in waveform by the LPF 7, 8 of waveform shaping type of low pass type, and entered into the carrier regenerator 9. The carrier regenerator 9 detects the phase information relating to the carrier from the input signal, and obtains a regenerated carrier. The frequency error detector 10 detects the frequency difference information of the intermediate frequency signal and oscillation frequency of the VCO 14 on the basis of the phase information of the carrier regenerator 9. The output of the detector 10 is smoothed by the frequency controller 11, and is converted into an analog signal by the DAC 13. The output of the DAC 13 controls the VCO 14, and corrects the oscillation frequency of the VCO 14.

After the AFC is stably converged, the operator 17 reads out the number of pulses from the pulse counter 16, and calculates the oscillation frequency of the VCO 14. Since this is the frequency at which the AFC is converged, the operator 17 subtracts the frequency offset foff of the VCO 14 from this frequency, and calculates the detuning frequency possessed by input modulated signal.

The operator 17 calculates the oscillation frequency of the local oscillator 2 and sets the local oscillator 2 so that the output signal frequency of the first mixer 1 of the input modulated signal detuned by the calculated detuning frequency may settle within the control band.

Thus, the operator 17 calculates the detuning frequency of the input modulated signal, and determines the oscillation frequency of the local oscillator 2 so that the output signal frequency of the first mixer 1 may settle within the preliminarily calculated control band, and therefore frequency signal exceeding the passing band frequency of the BPF 3 is not entered in the BPF 3. If the detuning frequency of the input modulated signal is altered due to changes in ambient temperature, the AFC is converged stably as far as the output signal frequency of the first mixer 1 is within the control band.

In the fourth embodiment, if the detuning frequency of the input modulated signal is increased and is out of the passing frequency band of the BPF 3, by determining the oscillation frequency of the local oscillator 2 so that the output signal frequency of the first mixer 1 may settle within the control band, the input modulated signal component is not cut off by the BPF 3, and the BER characteristic does not deteriorate.

Figure 5:
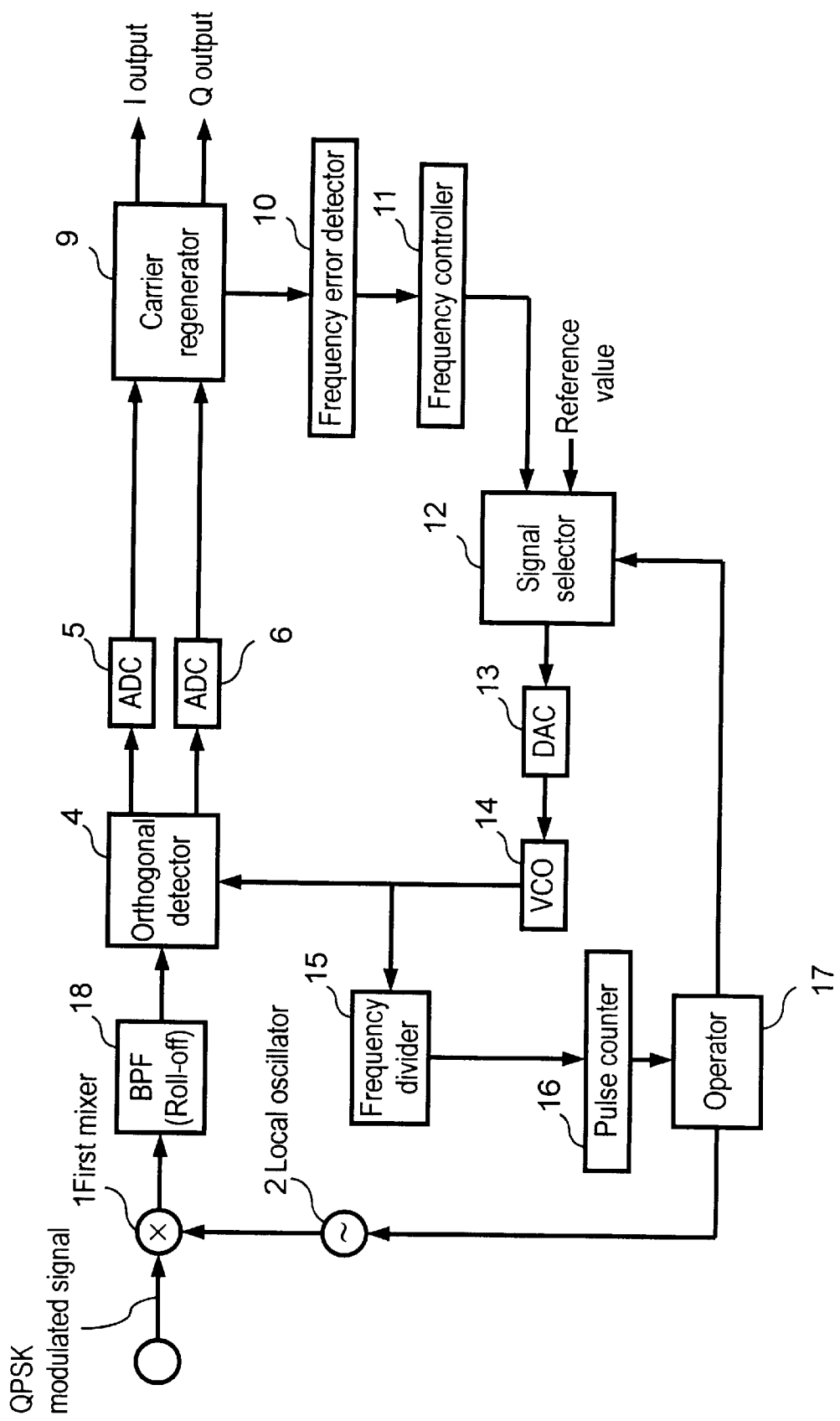
FIG. 5 is a block diagram of a demodulator in a fifth embodiment of the invention.

FIG. 5 is a block diagram of a demodulator in a fifth embodiment of the invention. In the explanation of FIG. 5, the parts having the same function as in FIG. 1 are identified with same reference numerals. By setting of an operator 17, a signal selector 12 selects a reference value. The selected reference value is converted into an analog signal by a DAC 13, and the oscillation frequency of a VCO 14 is defined. The output signal of the VCO 14 is divided into a lower frequency by a frequency divider 15, and the number of pulses is counted by a pulse counter 16 for a reference time.

The operator 17 reads out the counted value from the pulse counter 16.

On the basis of the frequency dividing ratio of the frequency divider 15 and the reference time and read-out counted value of the pulse counter 16, the operator 17 calculates the oscillation frequency of the VCO 14. Supposing the frequency dividing ratio of the frequency divider 15 to be D15, the reference time of the pulse counter 16 to be T1, and the read-out counted value to be N1, the oscillation frequency f1-1 of the VCO 14 is determined in the following formula (5).

$$f1\text{-}1=(N1/T1)D15 \qquad (5)$$

The operator 17 calculates the difference between the design oscillation frequency and f1-1 when the reference value is set in the VCO 14, and calculates the frequency offset foff of the VCO 14.

In a control system of an AFC feedback loop composed of an orthogonal detector 4, ADC 5, 6, a carrier regenerator 9, a frequency error detector 10, a frequency controller 11, a signal selector 12, a DAC 13, and VCO 14, since foff corresponds to disturbance in the feedback loop, the controllable frequency band of the AFC is narrower by the portion equivalent to foff.

The operator 17 calculates the difference between the design value of the AFC controllable frequency band and foff, and calculates an AFC controllable frequency band f1-2. The operator 17 compares the passing frequency band f1-3 of a BPF 18 and f1-2. The lower frequency of the upper limit frequency of f1-2 and f1-3, and the higher frequency of the lower limit frequency are selected, and the frequency band defined by them is set as a control band.

The operator 17 closes the feedback loop of the AFC by using the signal selector 12.

The modulated signal entered in a first mixer 1 is converted in frequency to an intermediate frequency signal. A local oscillator 2 is connected to the first mixer 1, and the oscillation frequency is set by the operator 17. The intermediate frequency signal is shaped in waveform by the BPF 18 having waveform shaping function, and is converted into I, Q base band signals by the orthogonal detector 4. The VCO 14 is connected to the orthogonal detector 4. The I, Q base band signals converted in frequency by the portion of oscillation frequency of the VCO 14 are converted into a digital value by the ADC 5, 6, and entered into the carrier regenerator 9. The carrier regenerator 9 detects the phase information relating to the carrier from the input signal, and obtains a regenerated carrier. The frequency error detector 10 detects the frequency difference information of the intermediate frequency signal and oscillation frequency of the VCO 14 on the basis of the phase information of the carrier regenerator 9. The output of the detector 10 is smoothed by the frequency controller 11, and is converted into an analog signal by the DAC 13. The output of the DAC 13 controls the VCO 14, and corrects the oscillation frequency of the VCO 14.

After the AFC is stably converged, the operator 17 reads out the number of pulses from the pulse counter 16, and calculates the oscillation frequency of the VCO 14. Since this is the frequency at which the AFC is converged, the operator 17 subtracts the frequency offset foff of the VCO 14 from this frequency, and calculates the detuning frequency possessed by input modulated signal. The operator 17 calculates the oscillation frequency of the local oscillator 2 and sets in the local oscillator 2 so that the output signal frequency of the first mixer 1 of the input modulated signal detuned by the calculated detuning frequency may settle within the control band.

Thus, the operator 17 calculates the detuning frequency of the input modulated signal, and determines the oscillation frequency of the local oscillator 2 so that the output signal frequency of the first mixer 1 may settle within the preliminarily calculated control band, and therefore frequency signal exceeding the passing band frequency of the BPF 18 is not entered in the BPF 18. If the detuning frequency of the input modulated signal is altered due to changes in ambient temperature, the AFC is converged stably as far as the output signal frequency of the first mixer 1 is within the control band.

In the fifth embodiment, if the detuning frequency of the input modulated signal is increased and is out of the passing frequency band of the BPF 18, by determining the oscillation frequency of the local oscillator 2 so that the output signal frequency of the first mixer 1 may settle within the control band, the input modulated signal component is not cut off by the BPF 18, and the BER characteristic does not deteriorate.

Figure 6:
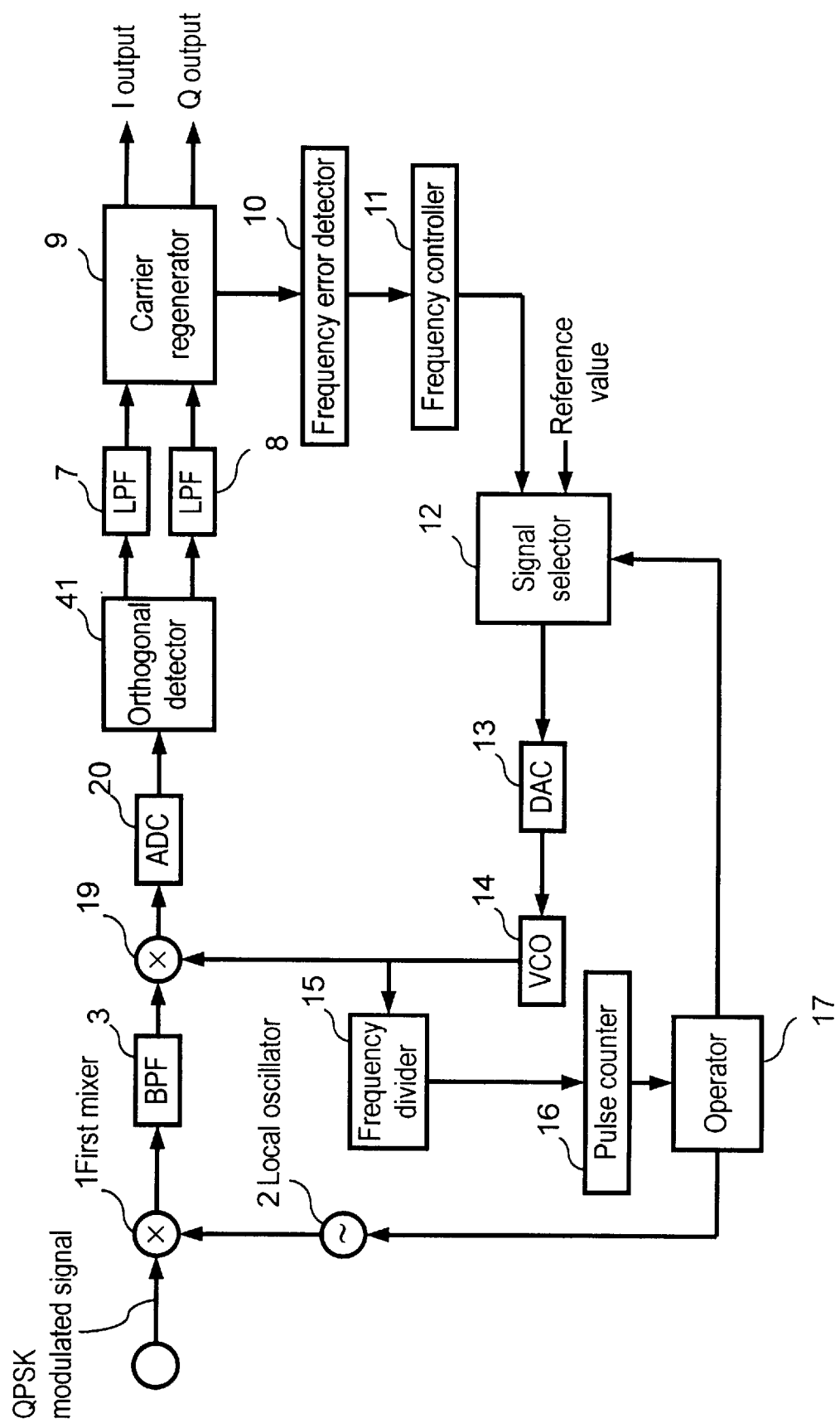
FIG. 6 is a block diagram of a demodulator in a sixth embodiment of the invention.
Figure 7:
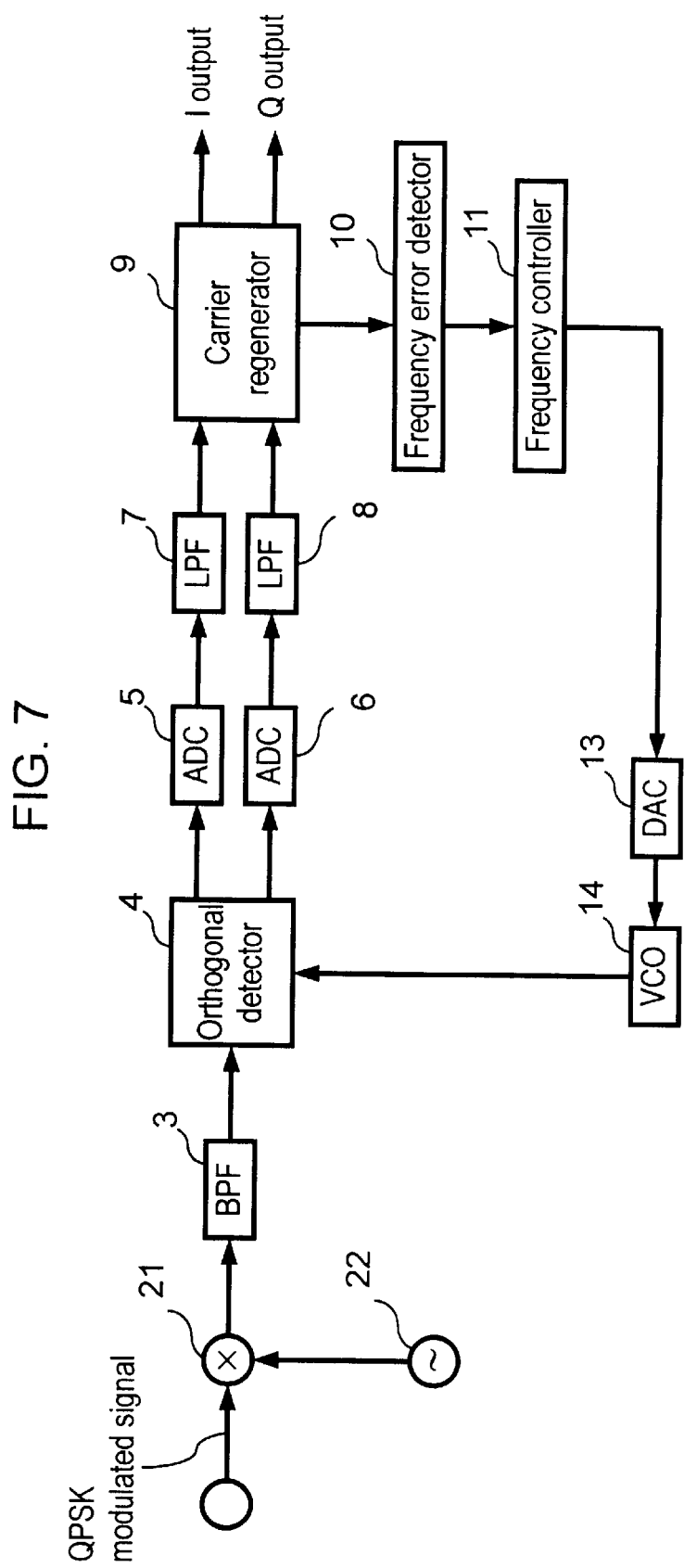
FIG. 7 is a block diagram of a demodulator in a prior art.

FIG. 6 is a block diagram of a demodulator in a sixth embodiment of the invention. In the explanation of FIG. 6, the parts having the same function as in FIG. 1 are identified with same reference numerals. By setting of an operator 17, a signal selector 12 selects a reference value. The selected reference value is converted into an analog signal by a DAC 13, and the oscillation frequency of a VCO 14 is defined. The output signal of the VCO 14 is divided into a lower frequency by a frequency divider 15, and the number of pulses is counted by a pulse counter 16 for a reference time.

The operator 17 reads out the counted value from the pulse counter 16.

On the basis of the frequency dividing ratio of the frequency divider 15 and the reference time and read-out counted value of the pulse counter 16, the operator 17 calculates the oscillation frequency of the VCO 14. Supposing the frequency dividing ratio of the frequency divider 15 to be D15, the reference time of the pulse counter 16 to be T1, and the read-out counted value to be N1, the oscillation frequency f1-1 of the VCO 14 is determined in the following formula (6).

$$f1\text{-}1=(N1/T1)D15 \qquad (6)$$

The operator 17 calculates the difference between the design oscillation frequency and f1-1 when the reference value is set in the VCO 14, and calculates the frequency offset foff of the VCO 14.

In a control system of an AFC feedback loop composed of a second mixer 19, an ADC 20, an orthogonal detector 41, LPF 7, 8, a carrier regenerator 9, a frequency error detector 10, a frequency controller 11, a signal selector 12, a DAC 13, and VCO 14, since foff corresponds to disturbance in the feedback loop, the controllable frequency band of the AFC is narrower by the portion equivalent to foff.

The operator 17 calculates the difference between the design value of the AFC controllable frequency band and foff, and calculates an AFC controllable frequency band f1-2.

The operator 17 compares the passing frequency band f1-3 of a BPF 3 and f1-2. The lower frequency of the upper limit frequency of f1-2 and f1-3, and the higher frequency of the lower limit frequency are selected, and the frequency band defined by them is set as a control band.

The operator 17 closes the feedback loop of the AFC by using the signal selector 12.

The modulated signal entered in a first mixer 1 is converted in frequency to an intermediate frequency signal. A local oscillator 2 is connected to the first mixer 1, and the oscillation frequency is set by the operator 17. The intermediate frequency signal is shaped in waveform by the BPF 3 of band pass type, and is converted in frequency by the second mixer 19. The VCO 14 is connected to the second mixer 19. The signal converted in frequency by the portion of oscillation frequency of the VCO 14 is converted into a digital value by the ADC 20, and is converted into I, Q orthogonal signals by the orthogonal detector 41. The I, Q orthogonal signals are shaped in waveform by LPF 7, 8 having waveform shaping function of low pass type, and entered into the carrier regenerator 9. The carrier regenerator 9 detects the phase information relating to the carrier from the input signal, and obtains a regenerated carrier. The frequency error detector 10 detects the frequency difference information of the intermediate frequency signal and oscillation frequency of the VCO 14 on the basis of the phase information of the carrier regenerator 9. The output of the detector 10 is smoothed by the frequency controller 11, and is converted into an analog signal by the D/A converter 13. The output of the D/A converter 13 controls the VCO 14, and corrects the oscillation frequency of the VCO 14.

After the AFC is stably converged, the operator 17 reads out the number of pulses from the pulse counter 16, and calculates the oscillation frequency of the VCO 14. Since this is the frequency at which the AFC is converged, the operator 17 subtracts the frequency offset foff of the VCO 14 from this frequency, and calculates the detuning frequency possessed by input modulated signal.

The operator 17 calculates the oscillation frequency of the local oscillator 2 and sets in the local oscillator 2 so that the output signal frequency of the first mixer 1 of the input modulated signal detuned by the calculated detuning frequency may settle within the control band.

Thus, the operator 17 calculates the detuning frequency of the input modulated signal, and determines the oscillation frequency of the local oscillator 2 so that the output signal frequency of the first mixer 1 may settle within the preliminarily calculated control band, and therefore frequency signal exceeding the passing band frequency of the BPF 3 is not entered in the BPF 3. If the detuning frequency of the input modulated signal is altered due to changes in ambient temperature, the AFC is converged stably as far as the output signal frequency of the first mixer 1 is within the control band.

In the sixth embodiment, if the detuning frequency of the input modulated signal is increased and is out of the passing frequency band of the BPF 3, by determining the oscillation frequency of the local oscillator 2 so that the output signal frequency of the first mixer 1 may settle within the control band, the input modulated signal is not cut off by the BPF 3, and the BER characteristic does not deteriorate.

In the foregoing first to sixth embodiments, as mentioned above, after the AFC is stably converged, the operator 17 reads in the input signal, and calculates the frequency at which the AFC is converged.

In this case, the operator 17 subtracts the frequency offset foff of the VCO 14 from the AFC converging frequency, and calculates the detuning frequency possessed by input modulated signal.

The operator 17 calculates the oscillation frequency of the local oscillator 2 and sets the local oscillator 2 so that the output signal frequency of the first mixer 1 of the input modulated signal detuned by the calculated detuning frequency may be changed almost at the center frequency of the control band.

Thus, the operator 17 calculates the detuning frequency of the input modulated signal, and determines the oscillation frequency of the local oscillator 2 so that the output signal frequency of the first mixer 1 may settle almost at the center of the preliminarily calculated control band, and therefore intermediate frequency signal exceeding the passing band frequency of the BPF 3, 18 is not entered in the BPF 3, 18. By setting the start point frequency of control nearly at the center of the control range, the margin for ambient temperature changes may be maximum, and hence if the detuning frequency of the modulated signal is altered in the course of passing of the time, the AFC is converged stably as far as the output signal frequency of the first mixer 1 is within the control band.

Moreover, the operator 17 determines the oscillation frequency of the local oscillator 2 so that the output signal frequency of the first mixer 1 may settle almost at the center of the control band, and therefore if the detuning frequency of the input modulated signal is increased in the course of passing of the time, the input modulated signal is not cut off by the BPF 3, 18, and the BER characteristic does not deteriorate.

Instead of the aforesaid control methods intended to settle at the center of the control band, the following control methods may be also possible.

That is, in the demodulators in FIG. 1 to FIG. 6, after the AFC is stably converged, the operator 17 reads in the input signal, and calculates the AFC converging frequency. The operator 17 subtracts the frequency offset foff of the VCO 14 from the AFC converging frequency, and calculates the detuning frequency possessed by input modulated signal. The operator 17 calculates the oscillation frequency of the local oscillator 2 and sets the local oscillator 2 so that the output signal frequency of the first mixer 1 of the input modulated signal detuned by the calculated detuning frequency may be changed to a frequency deviated outward nearly from the center of the control band.

Thus, the operator 17 calculates the detuning frequency of the input modulated signal, and determines the oscillation frequency of the local oscillator 2 so that the output signal frequency of the first mixer 1 may settle at a frequency deviated outward nearly from the center of the preliminarily calculated control band, and therefore frequency signal exceeding the passing band frequency of the BPF 3, 18 is not entered in the BPF 3, 18.

Alternatively, when the input modulated signal has a detuning frequency near the specification limit, the degree of change of detuning frequency in the course of passing of the time is small in the specification limit direction and large in the opposite direction. In this case, when the control start point is determined nearly at the center of control range, certain frequencies are not used in the specification limit direction, and the control efficiency is poor. By starting the control frequency from a frequency deviated outward nearly from the center of control band, if the detuning frequency change is imbalanced in size depending on the direction, the margin for changes may be maximum, and if the detuning frequency of modulated signal changes significantly in the course of passing of the time, the AFC is converged stably as far as the output signal frequency of the first mixer 1 is within the control band.

That is, by determining the oscillation frequency of the local oscillator 2 so that the output signal frequency of the first mixer 1 may settle at a frequency deviated outward nearly from the center of the control band, if the detuning frequency of the input modulated signal is increased in the course of passing of the time, the input modulated signal component is not cut off by the BPF 3, 18, and the BER characteristic does not deteriorate.

Instead of these two control methods, the following control is also possible.

That is, in the demodulators in FIG. 1 to FIG. 6, after calculating the detuning frequency of the input modulated signal by the operator 17 and determining the oscillation frequency of the local oscillator 2 so that the output signal frequency of the first mixer 1 may settle within the preliminarily calculated control band, the pulse counter 16 continues to count the output of the frequency divider 15, and send it to the operator 17.

In the demodulator of the actual BS converter, a different frequency is assigned in each program, and the operation for selecting a station of a new frequency occurs very frequently. Accordingly, a shorter station selection time is one of important indices of performance of the demodulator. If, on every occasion of station selection, the operator 17 measures the frequency offset of the VCO 14 by using the signal selector 12, and takes in the output of the pulse counter 16 and reads the detuning frequency of the local oscillator 2, it takes an enormous time in station selection, and the performance of the demodulator is spoiled.

This problem is solved by making use of the following property of the demodulator of the BS converter.

Comparing the change rate of the detuning frequency of the local oscillator 2 of the demodulator of the BS converter in terms of the time, and the change rate of the frequency offset of the VCO 14 in terms of the time, the cause of the former is the ambient temperature, while the cause of the latter is the time-course change, and therefore the time change rate of the frequency offset of the VCO 14 is far smaller than the time change rate of the detuning frequency of the local oscillator 2, and the output change of the pulse counter 16 is dominated by the detuning frequency of the local oscillator 2 due to the ambient temperature changes. As the pulse counter 16 continues to count the output of the frequency divider 15 and send it out to the operator 17, the operator 17 receives the information of changes of detuning frequency of the local oscillator 2 due to ambient temperature changes.

When newly selecting a station, the operator 17 does not measure the frequency offset of the VCO 14 on every occasion, but directly calculates the detuning frequency of the input modulated signal from the counted value of the output of the frequency divider 15 by the pulse counter 16, and determines the oscillation frequency of the local oscillator 2 so that the output frequency of the first mixer 1 may be settle within the preliminarily calculated control band, so that the AFC may be stably converged in a short time.

That is, as the pulse counter 16 continues to count the output of the frequency divider 15 and send it out to the operator 17, the operator 17 receives the information of changes of detuning frequency of the local oscillator 2 due to ambient temperature changes, and therefore if the detuning frequency of the input modulated signal increases in the course of passing of the time, the input modulated signal component is not cut off by the BPF 3, 18, and the BER characteristic does not deteriorate, and moreover stable convergence of the AFC can be completed in a short time.

Instead of the above three methods of control, the following control may be also possible.

That is, in the demodulators in FIG. 1 to FIG. 6, if the detuning frequency of the local oscillator 2 of the demodulator of the BS converter is out of the control band, if the operator 17 sets the control band, and closes the feedback loop of the AFC by using the signal selector 12, the AFC is not converged stably. In this case, a desired station selection signal is present in either higher frequency band or lower frequency band of the control band. The operator 17 sends the output from the local oscillator 2 to the first mixer 1 so that the output frequency of the first mixer 1 may be changed in the higher frequency direction by the portion of the band frequency of the control band, or in the lower frequency direction.

If the AFC is not stably converged yet, the operator 17 repeats the operation of output from the local oscillator 2 to the first mixer 1 so as to change the output frequency of the first fixer 1 in the same direction as in the previous setting by the portion of the band frequency of the control band.

In this way, when stable conversion of AFC is not obtained, the operator 17 repeats the operation of output from the local oscillator 2 to the first mixer 1 so as to change the output frequency of the first mixer 1 in the same direction, that is, in the higher frequency direction or lower frequency direction by the portion of the band frequency of the control band, and therefore if the detuning frequency of the local oscillator 2 of the demodulator of the BS converter is too large to be out of the control band, the AFC can be converged stably.

Thus, the operator 17 can converge the AFC stably, by repeating the operation of output from the local oscillator 2 to the first mixer 1 so as to change the output frequency of the first mixer 1 in the same direction, that is, in the higher frequency direction or lower frequency direction by the portion of the band frequency of the control band, if the detuning frequency of the local oscillator 2 of the demodulator is too large to be out of the control band.

Instead of the above four methods of control, the following control may be also possible.

That is, in the demodulators in FIG. 1 to FIG. 6, if the detuning frequency of the local oscillator 2 of the demodulator is out of the control band, if the operator 17 sets the control band, and closes the feedback loop of the AFC by using the signal selector 12, the AFC is not converged stably. In this case, a desired station selection signal is present in either higher frequency band or lower frequency band of the control band.

The operator 17 sends the output from the local oscillator 2 to the first mixer 1 so that the output frequency of the first mixer 1 may be changed in the higher frequency direction by the portion of the band frequency of the control band, or in the lower frequency direction.

If the AFC is not stably converged yet, the operator 17 sends the output from the local oscillator 2 to the first mixer 1 so as to change the output frequency of the first fixer 1 in an opposite direction of the previous setting by a double portion of the band frequency of the control band.

Further, if the AFC is not stably converged yet, the operator 17 sends the output from the local oscillator 2 to the first mixer 1 so as to change the output frequency of the first fixer 1 in an opposite direction of the previous setting by a triple portion of the band frequency of the control band. In the same manner, so far as the AFC is not converged stably, the same operation is repeated by increasing the multiple to four times, five times, six times, and so forth.

In the demodulator of the actual BS converter, the detuning frequency of the local oscillator 2 of the demodulator may be either in higher frequency direction or in lower frequency direction of the control band. If the output frequency of the first mixer 1 is changed in one direction only, if the detuning frequency is present in the opposite direction, a tremendous time is needed in station selection, and the performance of the demodulator is impaired.

In this way, if stable convergence of AFC is not achieved, the operator 17 controls the output frequency of the first mixer 1 as mentioned above, and alternately changes the control band to higher frequency side to lower frequency side of the initial control band, so that the AFC is converged stably in a short time if deviated to either higher frequency direction or lower frequency direction, of the detuning frequency of the local oscillator 2 or initial control band.

That is, the operator 17 sends the output from the local oscillator 2 to the first mixer 1 so as to change the output frequency of the first mixer 1 in the higher frequency direction or lower frequency direction by the portion of the band frequency of the control band.

If the AFC is not stably converged yet, the operator 17 sends the output from the local oscillator 2 to the first mixer 1 so as to change the output frequency of the first fixer 1 in an opposite direction of the previous setting by a double portion of the band frequency of the control band.

Further, if the AFC is not stably converged yet, the operator 17 sends the output from the local oscillator 2 to the first mixer 1 so as to change the output frequency of the first fixer 1 in an opposite direction of the previous setting by a triple portion of the band frequency of the control band.

In the same manner, so far as the AFC is not converged stably, the same operation is repeated by increasing the multiple to four times, five times, six times, and so forth, that is, if the detuning frequency of the local oscillator 2 is too large to be out of the control band, the AFC can be stably converged in a short time.

Thus, the invention presents a demodulator comprising a first mixer for converting an input modulated signal into an intermediate frequency signal by frequency conversion, a local oscillator for issuing a local oscillation signal to this mixer, a first band pass filter of band pass type for shaping the waveform of the intermediate frequency signal converted in frequency by the mixer, an orthogonal detector for demodulating the signal shaped in waveform by this first band pass filter into orthogonal signals of I, Q channels, a VCO for issuing an oscillation signal to this detector, an A/D converter for converting the orthogonal signals of the I, Q channels into digital signals, a second low pass filter of low pass type for shaping the waveform of the output signal from this A/D converter, a carrier regenerator for detecting phase information relating to a carrier from the signal shaped in waveform by this low pass filter for obtaining a regenerated carrier, a frequency error detector for detecting the frequency difference information between the intermediate frequency signal and oscillation frequency of the VCO on the basis of the phase information of this carrier regenerator, a frequency controller for controlling the oscillation frequency of the VCO by the frequency difference information detected by this frequency error detector, a signal selector for selecting either the output of this frequency controller or the reference value, a D/A converter for converting the signal from this signal selector into an analog signal, and issuing to the VCO, a frequency divider for dividing the frequency of the output signal of the VCO, a pulse counter for counting signals divided in frequency by this frequency divider for a reference time, and an operator having a function of issuing a selection signal to the signal selector by the output of this pulse counter, and a function of setting the oscillation frequency of the local oscillator by the output of the frequency controller, in which the operator controls the local oscillator so that the output frequency of the mixer may exist within the passing frequency band of the first band pass filter, and also settle in the control band which is a frequency band controllable by an AFC feedback loop composed of the orthogonal detector, the carrier regenerator, the frequency error detector, the frequency controller, the signal selector, the DIA converter, and the VCO, and the local oscillator issues a local carrier to the mixer.

Preferably, the operator selects the reference value by using the signal selector, and when the feedback loop of the AFC is opened, the reference value is transmitted to the D/A converter, and is converted into an analog signal. By the analog signal, the VCO is controlled, and the oscillation frequency of the VCO is defined.

The output of the VCO is transmitted to the frequency divider. In the frequency divider, the oscillation frequency is divided, and is transmitted to the pulse counter to be counted for a specific time.

The operator detects the oscillation frequency of the VCO from the output of the pulse counter.

When the reference value is selected, the frequency difference between the design frequency oscillated by the VCO and the frequency measured by the frequency divider and pulse counter is the frequency offset of the VCO, and therefore the operator calculates the frequency band controllable by the AFC by using the calculated frequency offset of the VCO, and calculates the control band in the AFC controllable frequency band and in the passing band frequency band of the band pass filter.

The operator sets the frequency value calculated so that the output signal frequency of the mixer may settle within the control band, in the local oscillator.

The operator closes the feedback loop of the AFC by using the signal selector.

The input modulated signal is converted into an intermediate frequency signal by the mixer. The local oscillator is connected to the mixer, and the oscillation frequency is set by the operator. The intermediate frequency signal is shaped in waveform by the first band pass filter of band pass type, and is converted into I, Q base band signals by the orthogonal detector. The VCO is connected to the orthogonal detector. The I, Q base band signals converted in frequency by the portion of the frequency of this VCO are converted into a digital value by the A/D converter, and shaped in waveform by the second low pass filter of low pass type, and put into the carrier regenerator. The carrier regenerator detects the phase information relating to the carrier from the input signal, and obtains a regenerated carrier. The frequency error detector detects the frequency difference information of the intermediate frequency signal and oscillation frequency of the VCO on the basis of the phase information of the carrier regenerator. The output of the frequency error detector is smoothed by the frequency controller, and is converted into an analog signal by the D/A converter. The output of the D/A converter controls the VCO, and corrects the oscillation frequency of the VCO.

The operator reads the frequency converged by the AFC from the output of the frequency controller.

This frequency includes tuning frequency component of the local oscillator of the demodulator and frequency offset component of the VCO, and therefore the operator calculates the detuning frequency component of the local oscillator by using the frequency offset component of the VCO calculated preliminarily.

The operator, using the detuning frequency component of the local oscillator, sets the frequency value calculated so that the output signal frequency of the mixer may settle within the control band, in the local oscillator.

The invention, by introducing the operator having such functions and the constitution into the conventional demodulator, solves the problems of dependence on ambient temperature of the local oscillator or dielectric resonator used in the VCO, detuning of the local oscillator exceeding the passing frequency band of the first band pass filter induces by time-course changes, narrowing of control frequency band of the AFC due to changes of the frequency offset amount of the voltage-frequency conversion sensitivity characteristics of the VCO, and others, and realizes a stable demodulator free from deterioration in error rate.

What is claimed is:

1. A demodulator comprising:
   a first mixer for converting an input modulated signal into an intermediate frequency signal by frequency conversion,
   a local oscillator for issuing a local oscillation signal to said mixer,
   a first band pass filter for shaping the waveform of the intermediate frequency signal converted in frequency by said mixer,
   an orthogonal detector for demodulating the signal shaped in waveform by said first band pass filter into orthogonal signals of I, Q channels,
   a voltage controlled oscillator (VCO) for issuing an oscillation signal to said orthogonal detector,
   an A/D converter for converting the orthogonal signals of said I, Q channels into digital signals,
   a second low pass filter for shaping the waveform of the output signal from said A/D converter,
   a carrier regenerator for detecting phase information relating to a carrier from the signal shaped in waveform by said low pass filter for obtaining a regenerated carrier,
   a frequency error detector for detecting the frequency difference information between said intermediate frequency signal and oscillation frequency of said VCO on the basis of the phase information of said carrier regenerator,
   a frequency controller for controlling the oscillation frequency of the VCO by the frequency difference information detected by said frequency error detector,
   a signal selector for selecting either the output of said frequency controller or a reference value,
   a D/A converter for converting the signal from said signal selector into an analog signal, and issuing to said VCO,
   a frequency divider for dividing the frequency of the output signal of said VCO,
   a pulse counter for counting signals divided in frequency by said frequency divider for a reference time, and
   an operator having a function of issuing a selection signal to said signal selector by the output of said pulse counter, and a function of setting the oscillation frequency of said local oscillator by the output of said frequency controller,
   wherein the operator controls the local oscillator so that the frequency of the output signal of said first mixer may exist within the passing frequency band of said first band pass filter, and also settle in the control band which is a frequency band controllable by an AFC feedback loop composed of said orthogonal detector, said carrier regenerator, said frequency error detector, said frequency controller, said signal selector, said D/A converter, and said VCO, and said local oscillator issues a local carrier to said first mixer.

2. A demodulator of claim 1, wherein the local carrier issued from the local oscillator to the first mixer is an output for changing the output frequency of said mixer to a frequency within the passing frequency band of the first band pass filter and nearly at the center frequency of the control band in a controllable frequency band of said AFC.

3. A demodulator of claim 1, wherein the local carrier issued from the local oscillator to the first mixer is an output for changing the output frequency of said mixer to a frequency deviated outward nearly from the center frequency of said control band.

4. A demodulator of any one of claims 1 to 3, wherein the pulse counter always counts the frequency of the input signal from the frequency divider, and issues to the operator.

5. A demodulator of any one of claims 1 to 3, wherein if the AFC feedback loop composed of the orthogonal detector, carrier regenerator, frequency error detector, frequency controller, signal selector, D/A converter, and VCO is not converged stably, the operator controls the local oscillator in the higher frequency direction or lower frequency direction so that the output frequency of the first mixer may be changed by the portion of the band frequency of the control band in the controllable frequency band of said AFC within the passing frequency band of said first band pass filter, and said local oscillator sends its output to said mixer.

6. A demodulator of claim 5, wherein if the AFC is not stably converged yet, the operator repeats the operation for changing the output frequency of the first mixer to the frequency further adding the portion of the band frequency in the same direction.

7. A demodulator of claim 5, wherein if said AFC is still not stably converged yet, the operator changes the output frequency of the first mixer by a double portion of the band frequency of the control band in an opposite direction, and if said AFC is not stably converged further yet, it changes the output frequency of said mixer by a triple portion of the band frequency of the control band in the opposite direction, and further if said AFC is not converged stably yet, it repeats the same operation by increasing the multiple to four times, five times, six times, and so forth.

8. A demodulator comprising:
   a first mixer for converting an input modulated signal into an intermediate frequency signal by frequency conversion,
   a local oscillator for issuing a local oscillation signal to said mixer,
   a roll-off filter of band pass type for shaping the waveform of the intermediate frequency signal converted in frequency by said mixer,
   an orthogonal detector for demodulating the signal shaped in waveform by said roll-off filter into orthogonal signals of I, Q channels,
   a VCO for issuing an oscillation signal to said orthogonal detector,
   an A/D converter for converting the orthogonal signals of said I, Q channels into digital signals,
   a carrier regenerator for detecting phase information relating to a carrier from the output signal of said A/D converter for obtaining a regenerated carrier,
   a frequency error detector for detecting the frequency difference information between said intermediate frequency signal and oscillation frequency of said VCO on the basis of the phase information of said carrier regenerator,
   a frequency controller for controlling the oscillation frequency of the VCO by the frequency difference information detected by said frequency error detector,
   a signal selector for selecting either the output of said frequency controller or a reference value,
   a D/A converter for converting the signal from said signal selector into an analog signal, and issuing to said VCO, a frequency divider for dividing the frequency of the output signal of said VCO, a pulse counter for counting signals divided in frequency by said frequency divider for a reference time, and an operator having a function of issuing a selection signal to said signal selector by the output of said pulse counter, and a function of setting the oscillation frequency of said local oscillator by the output of said frequency controller, wherein the operator controls the local oscillator so that the frequency of the output signal of said first mixer may exist within the passing frequency band of said roll-off filter, and also settle in the control band which is a frequency band controllable by an AFC feedback loop composed of said orthogonal detector, said carrier regenerator, said frequency error detector, said frequency controller, said signal selector, said D/A converter, and said VCO, and said local oscillator issues a local carrier to said first mixer.

9. A demodulator of claim 8, wherein the local carrier issued from the local oscillator to the first mixer is an output for changing the output frequency of said mixer to a frequency within the passing frequency band of the roll-off filter of band pass type and nearly at the center frequency of the control band in a controllable frequency band of said AFC.

10. A demodulator of claim 8, wherein the local carrier issued from the local oscillator to the first mixer is an output for changing the output frequency of said mixer to a frequency deviated outward nearly from the center frequency of said control band.

11. A demodulator of any one of claims 8 to 10, wherein the pulse counter always counts the frequency of the input signal from the frequency divider, and issues to the operator.

12. A demodulator of any one of claims 8 to 10, wherein if the AFC feedback loop composed of the orthogonal detector, carrier regenerator, frequency error detector, frequency controller, signal selector, D/A converter, and VCO is not converged stably, the operator controls the local oscillator in the higher frequency direction or lower frequency direction so that the output frequency of the mixer may be changed by the portion of the band frequency of the control band in the controllable frequency band of said AFC within the passing frequency band of said roll-off filter of band pass type, and a local carrier is issued from said local oscillator to said first mixer.

13. A demodulator of claim 12, wherein if the AFC is not stably converged yet, the operator repeats the operation for changing the output frequency of the first mixer to the frequency further adding the portion of the band frequency in the same direction.

14. A demodulator of claim 12, wherein if said AFC is still not stably converged yet, the operator changes the output frequency of the first mixer by a double portion of the band frequency of the control band in an opposite direction, and if said AFC is not stably converged further yet, it changes the output frequency of said mixer by a triple portion of the band frequency of the control band in the opposite direction, and further if said AFC is not converged stably yet, it repeats the same operation by increasing the multiple to four times, five times, six times, and so forth.

15. A demodulator comprising:

a first mixer for converting an input modulated signal into an intermediate frequency signal by frequency conversion, a local oscillator for issuing a local oscillation signal to said mixer, a first band pass filter for shaping the waveform of the intermediate frequency signal converted in frequency by said mixer, a second mixer for receiving the signal shaped in waveform by said first band pass filter, a VCO for issuing an oscillation signal to said second mixer, an A/D converter for converting the output signal from said second mixer into a digital signal, an orthogonal detector for demodulating the output signal of said A/D converter into orthogonal signals of I, Q channels, a second low pass filter for shaping the waveform of the output signal from said orthogonal detector, a carrier regenerator for detecting phase information relating to a carrier from the signal shaped in waveform by said second low pass filter for obtaining a regenerated carrier, a frequency error detector for detecting the frequency difference information between said intermediate frequency signal and oscillation frequency of said VCO on the basis of the phase information of said carrier regenerator, a frequency controller for controlling the oscillation frequency of said VCO by the frequency difference information detected by said frequency error detector, a signal selector for selecting either the output of said frequency controller or a reference value, a D/A converter for converting the signal from said signal selector into an analog signal, and issuing to said VCO, a frequency divider for dividing the frequency of the output signal of said VCO, a pulse counter for counting signals divided in frequency by said frequency divider for a reference time, and an operator having a function of issuing a selection signal to said signal selector by the output of said pulse counter, and a function of setting the oscillation frequency of said local oscillator by the output of said frequency controller, wherein the operator controls the oscillation frequency of said local oscillator so that the frequency of the output signal of said first mixer may exist within the passing frequency band of said first band pass filter, and also settle in the control band which is a frequency band controllable by an AFC feedback loop composed of said second mixer, said orthogonal detector, said carrier regenerator, said frequency error detector, said frequency controller, said signal selector, said D/A converter, and said VCO, and said local oscillator issues a local carrier to said first mixer.

16. A demodulator of claim 15, wherein the local carrier issued from the local oscillator to the first mixer is an output for changing the output frequency of said mixer to a frequency within the passing frequency band of the first band pass filter and nearly at the center frequency of the control band in a controllable frequency band of said AFC.

17. A demodulator of claim 15, wherein the local carrier issued from the local oscillator to the first mixer is an output for changing the output frequency of said mixer to a frequency deviated outward nearly from the center frequency of said control band.

18. A demodulator of any one of claims 15 to 17, wherein the pulse counter always counts the frequency of the input signal from the frequency divider, and issues to the operator.

19. A demodulator of any one of claims 15 to 17, wherein if the AFC feedback loop composed of the second mixer, orthogonal detector, carrier regenerator, frequency error detector, frequency controller, signal selector, D/A converter, and VCO is not converged stably, the operator controls the local oscillator in the higher frequency direction or lower frequency direction so that the output frequency of said first mixer may be changed by the portion of the band frequency of the control band in the controllable frequency band of said AFC within the passing frequency band of said first band pass filter, and the local carrier is issued from said local oscillator to the first mixer.

20. A demodulator of claim 19, wherein if the AFC is not stably converged yet, the operator repeats the operation for changing the output frequency of the first mixer to the frequency further adding the portion of the band frequency in the same direction.

21. A demodulator of claim 19, wherein if said AFC is still not stably converged yet, the operator changes the output frequency of the first mixer by a double portion of the band frequency of the control band in an opposite direction, and if said AFC is not stably converged further yet, it changes the output frequency of said mixer by a triple portion of the band frequency of the control band in the opposite direction, and further if said AFC is not converged stably yet, it repeats the same operation by increasing the multiple to four times, five times, six times, and so forth.

22. A demodulator comprising:
a first mixer for converting an input modulated signal into an intermediate frequency signal by frequency conversion,
a local oscillator for issuing a local oscillation signal to said mixer,
a first band pass filter for shaping the waveform of the intermediate frequency signal converted in frequency by said mixer,
an orthogonal detector for demodulating the signal shaped in waveform by said first band pass filter into orthogonal signals of I, Q channels,
a VCO for issuing a local oscillation signal to said orthogonal detector,
an A/D converter for converting the orthogonal signals of said I, Q channels into digital signals,
a second low pass filter for shaping the waveform of the output signal from said A/D converter,
a carrier regenerator for detecting phase information relating to a carrier from the signal shaped in waveform by said low pass filter for obtaining a regenerated carrier,
a frequency error detector for detecting the frequency difference information between said intermediate frequency signal and oscillation frequency of said VCO on the basis of the phase information of said carrier regenerator,
a frequency controller for controlling the oscillation frequency of the VCO by the frequency difference information detected by said frequency error detector,
a signal selector for selecting either the output of said frequency controller or a reference value,
a D/A converter for converting the signal from said signal selector into an analog signal, and issuing to said VCO,
a frequency divider for dividing the frequency of the output signal of said VCO,
a pulse counter for counting signals divided in frequency by said frequency divider for a reference time, and
an operator having a function of issuing a selection signal to said signal selector by the output of said pulse counter, and a function of setting the oscillation frequency of said local oscillator,
wherein the operator controls the local oscillator so that the frequency of the output signal of said first mixer may exist within the passing frequency band of said first band pass filter, and also settle in the control band which is a frequency band controllable by an AFC feedback loop composed of said orthogonal detector, said carrier regenerator, said frequency error detector, said frequency controller, said signal selector, said D/A converter, and said VCO, and said local oscillator issues a local carrier to said first mixer.

23. A demodulator of claim 22, wherein the local carrier issued from the local oscillator to the first mixer is an output for changing the output frequency of said mixer to a frequency within the passing frequency band of the first band pass filter and nearly at the center frequency of the control band in a controllable frequency band of said AFC.

24. A demodulator of claim 22, wherein the local carrier issued from the local oscillator to the first mixer is an output for changing the output frequency of said mixer to a frequency deviated outward nearly from the center frequency of said control band.

25. A demodulator of any one of claims 22 to 24, wherein the pulse counter always counts the frequency of the input signal from the frequency divider, and issues to the operator.

26. A demodulator of any one of claims 22 to 24, wherein if the AFC feedback loop composed of the orthogonal detector, carrier regenerator, frequency error detector, frequency controller, signal selector, D/A converter, and VCO is not converged stably, the operator controls the local oscillator in the higher frequency direction or lower frequency direction so that the output frequency of the first mixer may be changed by the portion of the band frequency of the control band in the controllable frequency band of said AFC within the passing frequency band of said first band pass filter, and its output is sent from said local oscillator to the first mixer.

27. A demodulator of claim 26, wherein if the AFC is not stably converged yet, the operator repeats the operation for changing the output frequency of the first mixer to the frequency further adding the portion of the band frequency in the same direction.

28. A demodulator of claim 26, wherein if said AFC is still not stably converged yet, the operator changes the output frequency of the first mixer by a double portion of the band frequency of the control band in an opposite direction, and if said AFC is not stably converged further yet, it changes the output frequency of said mixer by a triple portion of the band frequency of the control band in the opposite direction, and further if said AFC is not converged stably yet, it repeats the same operation by increasing the multiple to four times, five times, six times, and so forth.

29. A demodulator comprising:
a first mixer for converting an input modulated signal into an intermediate frequency signal by frequency conversion,
a local oscillator for issuing a local oscillation signal to said mixer,
a roll-off filter of band pass type for shaping the waveform of the intermediate frequency signal converted in frequency by said mixer,
an orthogonal detector for demodulating the signal shaped in waveform by said filter into orthogonal signals of I, Q channels,
a VCO for issuing a local oscillation signal to said orthogonal detector, an A/D converter for converting the orthogonal signals of said I, Q channels into digital signals, a carrier regenerator for detecting phase information relating to a carrier from the output signal of said A/D converter for obtaining a regenerated carrier, a frequency error detector for detecting the frequency difference information between said intermediate frequency signal and oscillation frequency of said VCO on the basis of the phase information of said carrier regenerator, a frequency controller for controlling the oscillation frequency of the VCO by the frequency difference information detected by said frequency error detector, a signal selector for selecting either the output of said frequency controller or a reference value, a D/A converter for converting the signal from said signal selector into an analog signal, a frequency divider for dividing the frequency of the output signal of said VCO, a pulse counter for counting signals divided in frequency by said frequency divider for a reference time, and an operator having a function of issuing a selection signal to said signal selector by the output of said pulse counter, and a function of setting the oscillation frequency of said local oscillator, wherein the operator controls the local oscillator so that the frequency of the output signal of said first mixer may exist within the passing frequency band of said roll-off filter of band pass type, and also settle in the control band which is a frequency band controllable by an AFC feedback loop composed of said detector, said carrier regenerator, said frequency error detector, said frequency controller, said signal selector, said D/A converter, and said VCO, and said local oscillator issues a local carrier to said first mixer.

30. A demodulator of claim 29, wherein the local carrier issued from the local oscillator to the first mixer is an output for changing the output frequency of said first mixer to a frequency within the passing frequency band of the roll-off filter and nearly at the center frequency of the control band in a controllable frequency band of said AFC.

31. A demodulator of claim 29, wherein the local carrier issued from the local oscillator to the first mixer is an output for changing the output frequency of said first mixer to a frequency deviated outward nearly from the center frequency of said control band.

32. A demodulator of any one of claims 29 to 31, wherein the pulse counter always counts the input from the frequency divider, and issues to the operator.

33. A demodulator of any one of claims 29 to 31, wherein if the AFC feedback loop composed of the orthogonal detector, carrier regenerator, frequency error detector, frequency controller, signal selector, D/A converter, and VCO is not converged stably, the operator controls the local oscillator in the higher frequency direction or lower frequency direction so that the output frequency of said first mixer may be changed by the portion of the band frequency of the control band in the controllable frequency band of said AFC within the passing frequency band of said roll-off filter of band pass type, and its output is issued from said local oscillator to said mixer.

34. A demodulator of claim 33, wherein if the AFC is not stably converged yet, the operator repeats the operation for changing the output frequency of the first mixer to the frequency further adding the portion of the band frequency in the same direction.

35. A demodulator of claim 33, wherein if said AFC is still not stably converged yet, the operator changes the output frequency of the first mixer by a double portion of the band frequency of the control band in an opposite direction, and if said AFC is not stably converged further yet, it changes the output frequency of said mixer by a triple portion of the band frequency of the control band in the opposite direction, and further if said AFC is not converged stably yet, it repeats the same operation by increasing the multiple to four times, five times, six times, and so forth.

36. A demodulator comprising:

a first mixer for converting an input modulated signal into an intermediate frequency signal by frequency conversion, a local oscillator for issuing a local oscillation signal to said mixer, a first band pass filter for shaping the waveform of the intermediate frequency signal converted in frequency by said mixer, a second mixer for receiving the signal shaped in waveform by said first band pass filter, a VCO for issuing an oscillation signal to said second mixer, an A/D converter for converting the output signal from said second mixer into a digital signal, an orthogonal detector for demodulating the output signal of said A/D converter into orthogonal signals of I, Q channels, a second low pass filter for shaping the waveform of the output signal from said orthogonal detector, a carrier regenerator for detecting phase information relating to a carrier from the signal shaped in waveform by said second low pass filter for obtaining a regenerated carrier, a frequency error detector for detecting the frequency difference information between said intermediate frequency signal and oscillation frequency of said VCO on the basis of the phase information of said carrier regenerator, a frequency controller for controlling the oscillation frequency of said VCO by the frequency difference information detected by said frequency error detector, a signal selector for selecting either the output of said frequency controller or the reference value, a D/A converter for converting the signal from said signal selector into an analog signal, and issuing to said VCO, a frequency divider for dividing the frequency of the output signal of said VCO, a pulse counter for counting signals divided in frequency by said frequency divider for a reference time, and an operator having a function of issuing a selection signal to said signal selector by the output of said pulse counter, and a function of setting the oscillation frequency of said local oscillator, wherein the operator controls said local oscillator so that the frequency of the output signal of said first mixer may exist within the passing frequency band of said first band pass filter, and also settle in the control band which is a frequency band controllable by an AFC feedback loop composed of said second mixer, said orthogonal detector, said carrier regenerator, said frequency error detector, said frequency controller, said signal selector, said D/A converter, and said VCO, and said local oscillator issues a local carrier to said first mixer.

37. A demodulator of claim 36, wherein the local carrier issued from the local oscillator to the first mixer is an output for changing the output frequency of said mixer to a frequency within the passing frequency band of the first band pass filter and nearly at the center frequency of the control band in a controllable frequency band of said AFC.

38. A demodulator of claim 36, wherein the local carrier issued from the local oscillator to the first mixer is an output for changing the output frequency of said mixer to a frequency deviated outward nearly from the center frequency of said control band.

39. A demodulator of any one of claims 36 to 38, wherein the pulse counter always counts the frequency of the input signal from the frequency divider, and issues to the operator.

40. A demodulator of any one of claims 36 to 38, wherein if the AFC feedback loop composed of the second mixer, orthogonal detector, carrier regenerator, frequency error detector, frequency controller, signal selector, D/A converter, and VCO is not converged stably, the operator controls the local oscillator in the higher frequency direction or lower frequency direction so that the output frequency of said first mixer may be changed by the portion of the band frequency of the control band in the controllable frequency band of said AFC within the passing frequency band of said first band pass filter, and the local carrier is issued from said local oscillator to the first mixer.

41. A demodulator of claim 40, wherein if the AFC is not stably converged yet, the operator repeats the operation for changing the output frequency of the first mixer to the frequency further adding the portion of the band frequency in the same direction.

42. A demodulator of claim 40, wherein if said AFC is still not stably converged yet, the operator changes the output frequency of the first mixer by a double portion of the band frequency of the control band in an opposite direction, and if said AFC is not stably converged further yet, it changes the output frequency of said mixer by a triple portion of the band frequency of the control band in the opposite direction, and further if said AFC is not converged stably yet, it repeats the same operation by increasing the multiple to four times, five times, six times, and so forth.

* * * * *